UNITED STATES PATENT OFFICE.

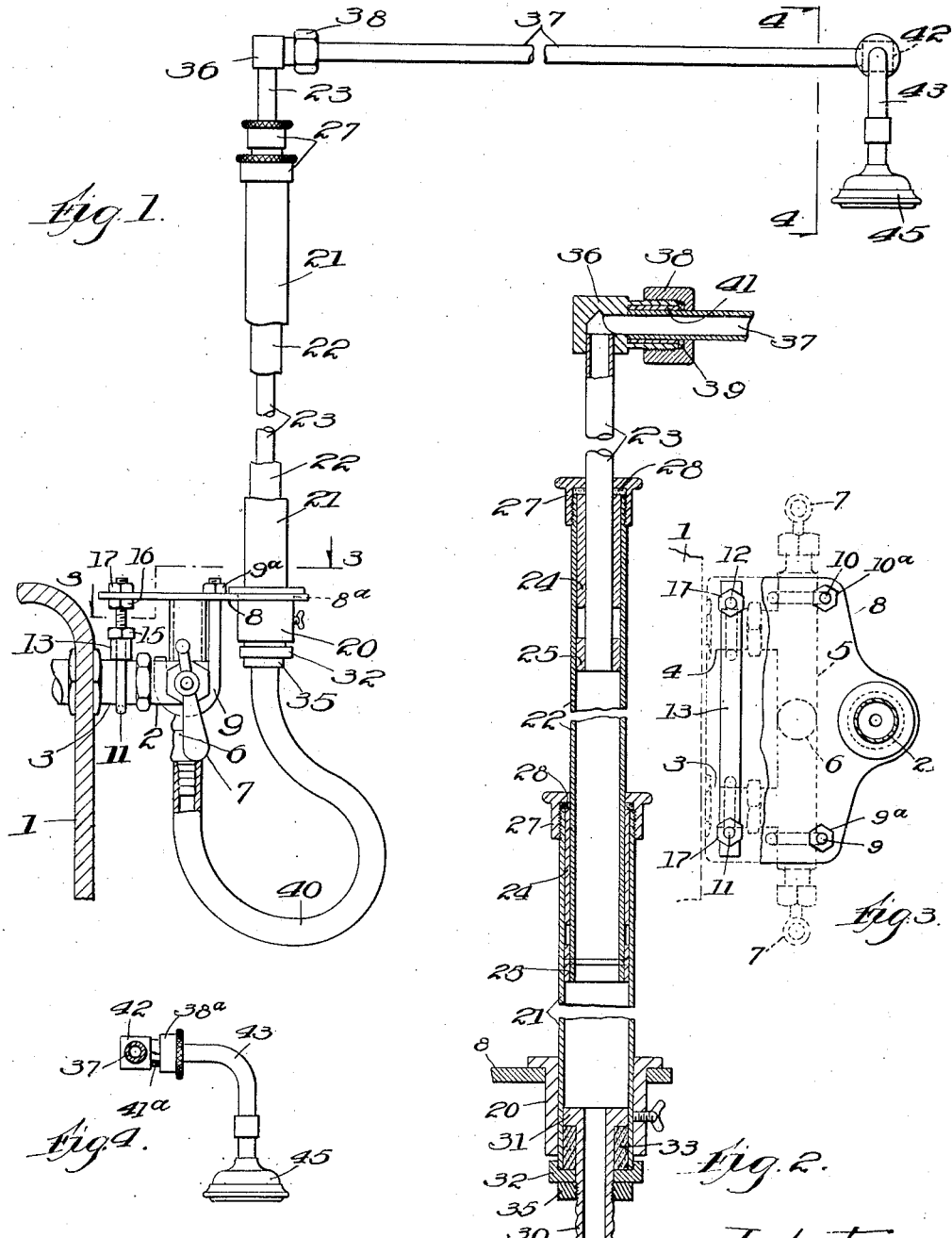

FRANK A. EDWARDS, OF CHICAGO, ILLINOIS, ASSIGNOR OF ONE-HALF TO ARTHUR SPARROW, OF CHICAGO, ILLINOIS.

BATH FAUCET ATTACHMENT.

1,360,381.  Specification of Letters Patent.  Patented Nov. 30, 1920.

Application filed September 18, 1919. Serial No. 324,371.

*To all whom it may concern:*

Be it known that I, FRANK A. EDWARDS, a citizen of the United States, residing at Chicago, in the county of Cook and State of Illinois, have invented certain new and useful Improvements in Bath Faucet Attachments, of which the following is a specification, reference being had to the accompanying drawings, forming a part thereof.

The purpose of this invention is to provide an improved bath spray device, particularly adapted for mounting upon the faucet fitting of a bath-tub or the like, and for adjustment of the spray head to varying heights and directions of discharge, and for swinging horizontally to different positions around the axis of the upwardly-extending member of the device. It consists in the elements and features of construction shown and described, as indicated in the claims.

In the drawings:

Figure 1 is a side elevation of a device embodying this invention, the same being shown mounted upon the faucet fitting of a bath tub.

Fig. 2 is an axial section of the standpipe member and portion of an off-extending horizontal pipe arm.

Fig. 3 is a section at the line, 3—3, on Fig. 1.

Fig. 4 is a section at the line, 4—4, on Fig. 1.

In the drawings 1 is a portion of the section of a bath tub to the faucet of which the spray device constituting this invention is attached. 2 is a faucet fitting of the bath tub comprising the usual inleading pipe members, 3 and 4, for hot and cold water and their cross-connection, 5, leading to the discharge, 6, and constituting the bearings for the faucet valve handles, 7, 7, in the usual position and relation to the several pipe members of said fitting.

Upon the faucet fitting there is lodged a plate, 8, which is held securely to the fitting by means of hook bolts, 9 and 10, which engage around the cross member, 5, of the fitting, having nuts, 9ª and 10ª, on their upper ends above said plate, and also by hook bolts, 11 and 12, which engage around the in-leading pipe members, 3 and 4, and are clamped firmly thereto by means of a cross-tie bar, 13, on the stems of the bolts above the pipes, 3 and 4, and clamped against said pipes by nuts, 15, said hook bolts having their threaded stems extending up through the plate, 8, and clamped thereto by nuts, 16 and 17, above and below the plate. By this means the plate, 8, is held securely to the fitting and may be clamped on fittings varying considerably in dimension, with equal security. At the forward side the plate, 8, has an aperture, 8ª, which receives a flanged collar, 20, whose flange stops above the plate, 8. This collar is fast upon the lower end of the lower and outer telescoping member, 21, of the standpipe which comprises said telescoping member and as many successively interior members as may be desired for the purpose of vertical extension. As shown, the standpipe comprises beside the outermost member, 21, an exterior member, 22, and an innermost member, 23. Each of the successively exterior members,—that is, 22 and 21, has in the upper end a bushing, 24, which is made fast to the member within which it is placed, constituting a spacer and stop. Each of the successively interior members, 22 and 23, has at the lower end bushings, 25, on the outside, serving also as spacers and stops, the stops, 25, colliding with a stop, 24, at the limit of extension of the two telescoping members to which said stops and bushings respectively, pertain. Each of the successively exterior members,—that is, 22 and 21, has at the upper end a stuffing box, 27, with packing, 28, interposed between the flange of the stuffing box and the end of the pipe member on which the stuffing box is screwed and the outer surface of the next interior telescoping member, for effecting water-tight joint at the sliding bearing of said telescoped members upon each other. A nipple, 30, is provided at the lower end of the telescoping standpipe, having a flange, 31, which fits within the outermost of said telescoping members, 21, and on the lower end of said member, 21, there is applied a stuffing box, 32, for holding and compressing a packing, 33, interposed between the nipple and the stuffing box as shown. The stem of the nipple is exteriorly threaded and a nut, 35, provided thereon outside of the stuffing box serves for compressing the packing, 33. A flexible tube, 40, applied in the usual way to the end of the nipple, 30, and to the discharge, 6, of the faucet fitting, serves for connecting the faucet with the stand-pipe.

At the upper end of the innermost member, 23, of the telescoping standpipe, there is connected to it by an angle fitting, 36, an off-extending or horizontal pipe member, 37, which is connected to the fitting by a stuffing box, 38. The interlap or engagement of the pipe member, 37, with the horizontal branch of the angle fitting, 36, may be sufficiently long to make such stuffing box with the packing therein constitute an adequately secure connection. But preferably a bushing, 41, is fast on the end of the pipe, 37, and stopped against the packing gasket, 39, in the stuffing box, 38, constituting a piston engagement against longitudinal displacement while permitting the pipe, 37, to turn about its own axis at said connection,— that is, in the horizontal branch of the T-fitting, 36. At the other extremity of the pipe member, 37, it carries an angle fitting, 42, of which one branch is screwed to the end of the pipe, 37, and the other branch receives the end of an elbow, 43, which is held to the fitting by a stuffing box, with stop bushing, 41, and gasket, 39, the connection being in all respects similar to the connection of the pipe, 37, with the fitting, 36. The other end of the elbow carries the spray head, 45, attached in any convenient manner.

The operation of the device may be understood from the foregoing description of the construction. The standpipe may be extended to any desired height within the range of dimensions of the telescoping parts. The pipe member, 37, may be swung around to any position within a circle about the axis of the standpipe to carry the spray head to the desired position for delivering the spray. The pipe member, 37, may be turned about its axis to cause the spray head to project upward, downward, obliquely or horizontally in either direction; and the spray head itself may be turned about its swivel connection with the fitting, 42, so as to project in any direction in a plane parallel with the pipe member, 37.

The various utilities of the device will be understood from its construction and the various adjustments above indicated. With the spray head adjusted to the position shown in Fig. 1 and the standpipe extended so as to bring the spray-head just above the level of the shoulder of the user, the spray-head will deliver a shower upon the body of the bather without wetting the head. By reversing the position of the spray head so that it projects upward, the shower will be delivered in bell form so that the bather standing directly under the spray head will receive the shower all around his body without any direct delivery of water upon the head. By swinging the spray-head about its swivel connection with the end of the pipe, 37, the spray may be directed in any oblique direction downward; and the telescoping standpipe being extended so that the pipe, 37, is above the head of the bather, he can with his hand direct the spray-head in any desired direction to cause the spray delivered to strike higher or lower upon the body. As designed, the standpipe collapsed to its shortest dimension brings the pipe, 37, about two feet above the level of the edge of the bath tub to which the device is attached; and by turning the elbow, 43, so that the spray head projects upward, the position is suitable for discharge of the spray into the face of the bather standing erect in the tub. At this position of pipes also, the perforated discharge plate of the spray head being removed, the device is converted into a conveniently positioned and sanitary bubbling cup for drinking.

I claim:

1. A bath faucet attachment, comprising in combination with a support adapted to be mounted on the faucet fitting of the bath tub or the like, a stand-pipe; a flexible connection from the lower end of the standpipe to the discharge of the faucet; the means for supporting the standpipe on the faucet fitting, consisting of a plate adapted to be lodged above said fitting, and hook bolts depending from the plate for engaging the pipe members of the fitting, and nuts on said bolts above the plate for drawing the hooks into engagement under said pipe members, said plates having an aperture and the standpipe having at its lower end a flanged collar adapted to protrude through said aperture and be stopped by its flange above the plate.

2. A bath faucet attachment, comprising in combination, a support adapted to be mounted on the faucet fitting of a bath tub or the like, a standpipe; a flexible connection from the lower end of the standpipe to the discharge of the faucet; means for supporting the standpipe on the faucet fitting, consisting of a plate adapted to be lodged above the fitting; hook bolts depending from the plates for engaging the valve stem bearings of the fitting; hook bolts depending from the plate engaging the in-leading pipes of the fitting; a cross-tie on the last mentioned hook bolt above said pipes, and nuts on said last mentioned bolts for clamping the tie bar above the pipes.

In testimony whereof, I have hereunto set my hand at Chicago, Illinois, this 15th day of September, 1919.

FRANK A. EDWARDS.